United States Patent Office 3,396,168
Patented Aug. 6, 1968

3,396,168
DIBENZOCYCLOHEPTANE DERIVATIVES
Geradus Johannes Bertramszoon Corts, Haarlem, Netherlands, assignor to N.V. Koninklijke Pharmaceutische Fabrieken v/h Brocades-Stheeman & Pharmacia Meppel, Netherlands
No Drawing. Filed Feb. 12, 1964, Ser. No. 344,235
Claims priority, application Great Britain, Aug. 6, 1963, 31,052/63
13 Claims. (Cl. 260—292)

ABSTRACT OF THE DISCLOSURE

N-substituted - 3 - (dibenzo[a,d]-1,4-cycloheptadien-5-yloxy)nortropane derivatives in which the substituent on the tertiary N of the tropane nucleus is an alkyl having 2 to 8 carbon atoms, an aralkyl containing up to 8 carbon atoms in the alkyl moiety or a hydroxyalkyl containing up to 8 carbon atoms.

---

This invention relates to new derivatives of dibenzo-cyclo-heptane, to processes for their preparation, and pharmaceutical preparations containing them.

In this specification of U.S. application Ser. No. 16,660 filed Mar. 22, 1960, now Patent No. 3,119,829 there are described and claimed therapeutically active substances of the general formula:

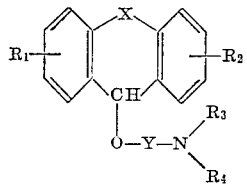

wherein X represents a —$CH_2$—$CH_2$— or —CH=CH— group, $R_1$ and $R_2$ are the same or different and each represent a hydrogen or halogen atom or an alkyl group having at most 4 carbon atoms, and the grouping —Y—$NR_3R_4$ represents a tropanyl radical, i.e. of the formula:

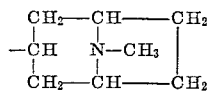

In the aforesaid specification it is mentioned that the compounds of Formula I are useful as antihistaminics and, moreover, have a very strong anti-acetylcholine activity.

It has now been found that compounds related in structure to those of the aforementioned formula also possess useful therapeutic properties.

The present invention accordingly provides the hitherto unknown N-substituted - 3 - (dibenzo[a,d]-1,4-cycloheptadien-5-yloxy)nortropane derivatives of the general formula:

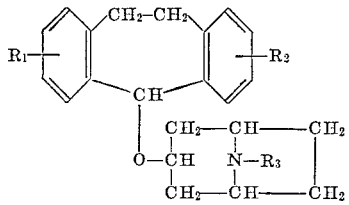

wherein $R_1$ and $R_2$ are the same or different and each represents a hydrogen or halogen atom or an alkyl group having at most 4 carbon atoms, and $R_3$ represents an alkyl group of 2 to 8 carbon atoms, or an aralkyl group containing up to 8 carbon atoms in the alkyl moiety (e.g. benzyl or β-phenylethyl) or a hydroxyalkyl group containing up to 8 carbon atoms, and their acid addition and quaternary ammonium salts.

The compounds of Formula II possess pharmacological properties which are useful in therapeutic applications; they exert a spasmolytic activity, especially a pronounced antihistaminic activity. Moreover, they are excellent local anesthetics and notably the compound of Formula II wherein $R_1$ and $R_2$ represent hydrogen atoms and $R_3$ represents an ethyl group and its non-toxic acid addition salts exhibit an outstanding activity in the aforesaid respect. On the cornea a solution of 3-(dibenzo[a,d]-1,4-cycloheptadien-5-yloxy)-8-ethylnortropine is active in a concentration of ¼% whereas cocaine exhibits the same effect in a concentration of 4%. Upon investigation of the infiltration anesthesia, carried out according to the method of Bülbring the same compound acted in a concentration of 4%, it was also clearly active in a ⅟₃₂% solution as a conduction anesthetic.

The latter investigation was carried out according to the method of Lembeck.

A 1% procaine solution had the same effect as the compound of the invention.

For the reasons given above 3-(dibenzo[a,d]-1,4-cycloheptadien-5-yloxy)-8-ethylnortropane and its acid addition salts form preferred feature of the invention.

The oral toxicity of the compounds of the invention expressed in $LD_{50}$ in mice is about 200–300 mg./kg.

According to a feature of the invention, the compounds of Formula II are prepared by reacting an N-substituted-nortropine derivative of the general formula:

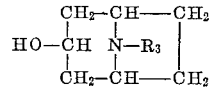

wherein $R_3$ is as hereinbefore defined, with a dibenzo (a,d)-1,4-cycloheptadien-5-yl halide of the general formula:

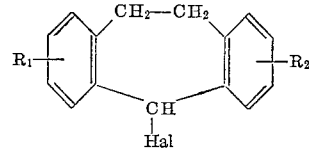

wherein $R_1$ and $R_2$ are as hereinbefore defined and Hal represents a halogen atom, preferably a chlorine atom. The etherification reaction is preferably carried out by heating the reactants in an inert, anhydrous organic solvent, such as benzene, toluene or xylene, advantageously containing a tertiary amine (preferably a tri(lower)alkylamine, e.g. tributylamine) or other suitable acid-binding substance. A modification of this method comprises reacting the dibenzo(a,d)-1,4-cycloheptadien-5-yl halide with an alkali metal salt such as the potassium or sodium salt of a nortropine of Formula III.

The N-substituted-nortropine derivatives of Formula III may be prepared by reacting nortropine with an acid halide of the general formula:

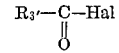

wherein $R_3$, represents an alkyl group containing 1 to 7 carbon atoms, or an aralkyl group containing up to 7 carbon atoms in the alkyl moiety or a hydroxyalkyl group containing up to 7 carbon atoms, and reducing the carbonyl group in the resulting amide of the formula:

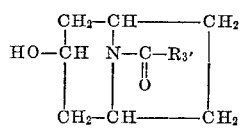

by methods known per se, e.g. with lithium aluminium hydride using a solvent medium such as ether or tetrahydrofuran.

Another method for the preparation of the N-substituted-nortropine derivatives of Formula III is the reaction of nortropine, the hydroxy group of which has been effectively protected (for example, with an acyl residue) with a compound of the formula:

VII wherein $R_3'$ is as hereinbefore defined, and simultaneously effecting a catalytic hydrogenation using, for example, Raney nickel as catalyst.

A further method for the preparation of the N-substituted nortropine derivatives of Formula III is a modification of Robinson's procedure for the production of tropine, the modification consisting of the replacement of methylamine by a primary amine of the formula $R_3NH_2$, wherein $R_3$ is as hereinbefore defined.

According to a further feature of the invention, the compounds of Formula II are prepared by substituting the hydrogen atom on the nitrogen atom of the nortropane radical in compounds of the general formula:

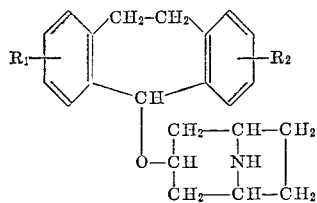

VIII (wherein $R_1$ and $R_2$ are as hereinbefore defined) with an alkyl group having 2 to 8 carbon atoms, or an aralkyl group containing up to 8 carbon atoms in the alkyl moiety or a hydroxyalkyl group containing up to 8 carbon atoms, by methods known per se for the alkylation of secondary amines.

The substitution may be effected for example, by reacting a compound of the general Formula VIII with an alkyl, aralkyl or hydroxyalkyl halide, the reaction then being preferably carried out by heating the reactants in an inert, anhydrous, organic solvent, such as benzene, toluene or xylene.

Alkylation (including aralkylation and hydroxyalkylation) of the secondary amino group of compounds of Formula VIII may also be effected by reacting the nortropane with an acid halide of Formula V and reducing the carbonyl group in the resulting amide of the general formula:

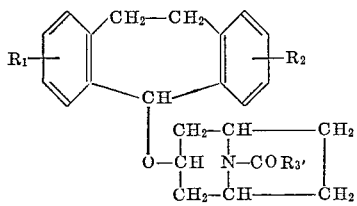

IX (wherein $R_1$, $R_2$, and $R_3'$ are as hereinbefore defined) to methylene, i.e. —$CH_2$—, by methods known per se, for example by catalytic hydrogenation. The alkylation may also be effected by reaction of a compound of Formula VIII with an aldehyde of Formula VII under reduction conditions, for example with simultaneous catalytic hydrogenation.

The term "methods known per se" as used in this specification means methods heretofore used or described in the literature.

Compounds of Formula II when used for therapeutic purposes may be employed as such or in the form of a non-toxic acid addition salt, i.e. a salt which is not harmful to the animal organism when used in therapeutic doses, derived from an inorganic acid, such as the hydrohalic acids (e.g. hydrochloric and hydrobromic acids), or an organic acid such as oxalic, maleic, fumaric, citric and tartaric acids.

The following examples, in which the temperatures mentioned are in degrees centigrade and the percentages are by weight, are given for the purpose of illustrating the invention, and are not to be construed as limitations of this invention, many variations of which are possible within the scope and spirit thereof.

EXAMPLE I (a) Preparation of N-ethylnortropine.—N-ethylnortropine is prepared by the reduction of N-ethylnortropinone according to the procedure used by K. Nador et al. (Arzneimittelforschung 12, 305, 1962) for the preparation of N-isopropylnortropine.

31 grams of N-ethylnortropinone are dissolved in 200 ml. of ethanol. Reduction is carried out over a period of 6 hours with an initial hydrogen pressure of 45 atmos. with 8 g. of Raney nickel. After completion of the reduction the catalyst is filtered off and the alcohol is removed by evaporation. The residue is crystallised from petroleum ether (boiling range: 80–100°). The product melts at 77°; the yield amounts to 65%.

(b) Preparation of 3-(dibenzo[a,d]-1,4-cycloheptadien-5-yloxy)-8-ethylnortropane.—10 grams of N-ethylnortropine are dissolved in 150 ml. of dry o-dichlorobenzene. The mixture is heated to 100° after which a solution of 7.31 g. of dibenzo [a,d]-1,4-cycloheptadien-5-yl chloride in 150 ml. of the same solvent are added over a period of 1½ hours. The reaction is allowed to proceed for 2 hours. 200 ml. of dry ether are added and the formed N-ethylnortropine hydrochloride is filtered off. The solvent is removed by distillation under reduced pressure and the residue is dissolved in acetone. After addition of an excess of citric acid a precipitate is formed. The precipitate is filtered off and crystallized from methanol. The yield of 3-(dibenzo[a,d]-1,4-cycloheptadien-5-yloxy)-8-ethylnortropane citrate is 90% and the melting point of the salt is 162–164°.

Analysis.—Calculated for $C_{30}H_{39}O_9N$: C, 66.79%; H, 6.91%; N, 2.60%. Found: C, 66.5%; H, 6.9%; N, 2.8%.

EXAMPLE II (a) Preparation of 3-(dibenzo[a,d]-1,4-cycloheptadien-5-yloxy)-8-octanoylnortropane.—To a solution of 11.5 g. of 3-(dibenzo[a,d]-1,4-cycloheptadien-5-yloxy)nortropane (prepared as described in the examples of the specification of our copending application No. 344,243, filed Feb. 12, 1964), in 75 ml. of anhydrous benzene kept at a temperature of 60° a solution of 2.9 g. of octanoyl chloride in 20 ml. of anhydrous benzene is added dropwise. The reaction mixture is kept at 60° for another 3 hours. It is then cooled to room temperature and left standing over night. Benzene is distilled off under reduced pressure and ether is added. A precipitate consisting of the hydrochloride of the nortropane derivative used as starting material is filtered off. The remaining solution is washed with a solution of maleic acid in ether and thereafter with a bicarbonate solution. Ether is distilled off after drying with sodium sulphate and filtration. The crude 3-(dibenzo[a,d]-1,4-cycloheptadien-5-yloxy)-8-octanoylnortropane obtained is used in the next step (b) without purification.

(b) Preparation of 3-(dibenzo[a,d]-1,4-cycloheptadien-5-yloxy)-8-octylnortropane.—The crude N-octanoylnortropane derivative obtained in accordance with step (a) is dissolved in 100 ml. of anhydrous ether and the solution slowly added to 0.57 g. of lithium aluminum hydride in 100 ml. of ether. The mixture is refluxed for 3 hours and residual hydride decomposed with the calculated amount of water in tetrahydrofuran. The hydroxides are removed by filtration and the filtrate is dried with sodium sulphate. Ether is distilled off, and the residue dissolved in 45 ml. of benzene and 12 ml. of pyridine and 3 ml. of acetylchloride are added to bind any unalkylated nortropane compounds left in the reaction mixture. The mixture is stirred for 1 hour, water is added and the benzene layer separated and washed repeatedly with water in order to remove pyridine. Benzene is distilled off after drying with sodium sulphate and filtration. The residue is dissolved in ether and a solution of maleic acid is added. The maleate of 3-(dibenzo[a,d] - 1,4 - cycloheptadien - 5-yloxy)-8-octylnortropane precipitates and is crystallised from a mixture of ethanol and ether. Melting point of the salt is 136–137° C.

*Analysis.*—Calculated for $C_{34}H_{45}NO_5$: C, 74.55%; H, 8.28%; N, 2.56%. Found: C, 74.9%; H, 8.5%; N, 3.1%.

EXAMPLE III

Preparation of 3-(dibenzo[a,d]-1,4-cycloheptadien-5-yloxy)-8-benzylnortropane.—To a solution of 9.6 g. of 3 - (dibenzo[a,d]-1,4-cycloheptadien-5-yloxy)nortropane in 60 ml. of anhydrous benzene kept at a temperature of 60° is slowly added a solution of 2.6 g. of benzyl bromide in 10 ml. of anhydrous benzene. The mixture is refluxed for 17 hours. The benzene solvent is distilled off under reduced pressure and ether is added to the cooled residue. The undissolved hydrobromide of 3-(dibenzo[a,d]-1,4-cycloheptadien-5-yloxy)nortropane is removed by filtration. Any remaining unbenzylated starting material is acetylated by addition of 40 ml. of benzene, 11 ml. of pyridine and 3 ml. of acetyl chloride. The mixture is stirred for 1 hour, water is added, the benzene layer separated and washed repeatedly with water. Benzene is distilled off after drying with sodium sulphate and filtration. The free base is dissolved in ether and a solution of maleic acid in the same solvent is added. The maleate of 3-(dibenzo[a,d]-1,4-cycloheptadien-5-yloxy)-8-benzylnortropane precipitates and is isolated by filtration. It can be purified by crystallization from a mixture of ethanol and ether. Melting point of the maleate is 175–178°.

*Analysis.*—Calculated for $C_{33}H_{35}NO_5$: C, 75.42%; H, 6.71%; N, 2.66%. Found: C, 75.9%; H, 6.8%, N, 2.7%.

EXAMPLE IV (a) *Preparation of N-(β-phenylethyl) nortropine.*—3 g. of N-carboxy nortropine are dissolved in 25 ml. of methanol and warmed at 50° for 10 minutes. The solution is cooled and 10 g. of phenylacetaldehyde dissolved in 100 ml. of methanol are added. The mixture is reduced with hydrogen and Raney nickel catalyst over a period of 30 hours. The resulting solution is filtered and the solvent removed by distillation. An ethereal solution of hydrogen chloride is added which causes the hydrochloride of N-(β-phenylethyl)nortropine to precipitate. The solid is filtered off and washed with 3 portions each of 25 ml. of anhydrous ether. The salt melts at 198° and can be used for the next step without further purification.

(b) *Preparation of 3-(dibenzo[a,d]-1,4-cycloheptadien-5-ylogy)-8-(β-phenylethyl)nortropane.*—3 g. of N-(β-phenylethyl)nortropine hydrochloride are dissolved in 20 ml. of water. The solution is made strongly alkaline by addition of sodium hydroxide. It is then extracted with ether. The ethereal solution is dried with sodium sulphate and concentrated by evaporation of the solvent. The residue is dissolved in 75 ml. of o-dichlorobenzene. 1.25 g. of dibenzo(a,d)-1,4-cycloheptadien-5-yl chloride dissolved in 75 ml. of anhydrous o-dichlorobenzene are added at a temperature of 100° at such a rate that the addition takes place over a period of about 1 hour. Stirring is continued for 1 hour at the same temperature, and the solution is left standing overnight. The hydrochloride of N-(β-phenylethyl) nortropine is caused to precipitate by the addition of 100 ml. of anhydrous ether. o-Dichlorobenzene is removed by distillation. The residue is dissolved in acetone. A solution of maleic acid in ether is edded and the maleate of 3-(dibenzo[a,d]-1,4-cycloheptadien-5-yloxy)-8-(β-phenylethyl)nortropane is obtained in crystalline form. The salt can be purified by crystallization from a mixture of ethanol and ether. Melting point of the maleate is 205–207°.

*Analysis.*—Calculated for $C_{34}H_{37}NO_5$: C, 75.67%; H, 6.91%; N, 2.59%. Found: C, 75.4%; H, 6.9%; N, 2.7%.

The invention includes within its scope pharmaceutical preparations containing, as active ingredient, an N-substituted-3-(dibenzo[a,d] - 1,4 - cycloheptadien - 5 - yloxy) nortropane derivative of Formula II, or non-toxic acid addition salt thereof, in association with a pharmacologically acceptable carrier. The preparations may take any of the forms customarily employed for administration of therapeutically active substances. If oral administration is the preferred mode of administration—which largely depends on the nature of the condition to combat—especially tablets, pills, and capsules including the substance are preferably used. The tablets and pills may be formulated in the usual manner with one or more pharmacologically acceptable diluents or excipients, such as lactose or starch, and include materials of a lubricating nature such as magnesium or calcium stearate, and colouring substances. Capsules made of absorbable material, for example gelatin, may contain the active substance alone or in admixture with a solid or liquid diluent. Especially if the local anesthetic activity plays an important role, parenteral administration may be employed. In such cases the active component may be made into a liquid preparation such as a suspension, emulsion, syrup or elixir in water or other liquid medium commonly used for making solutions for injection.

The active substance may be made up in the form of a suspension or emulsion in sterile water or an organic liquid usually employed for injectable preparations, for example a vegetable oil such as olive-oil, or a sterile solution in an organic solvent.

The following examples illustrate pharmaceutical preparations according to the invention.

EXAMPLE V

Tablets each containing 4 mg. of 3-(dibenzo[a,d]-1,4-cycloheptadien-5-yloxy)-8-benzylnortropane are prepared in accordance with conventional pharmaceutical practice from a mixture of the following substances:

| | Kg. |
|---|---|
| 3 - (dibenzo[a,d] - 1,4 - cycloheptadien - 5 -yloxy)-8-benzylnortropane maleate | 0.80 |
| Lactose | 30.20 |
| Potato starch | 8.19 |
| Disodium hydrogen phosphate $2H_2O$ | 0.35 |
| Potassium dihydrogen phosphate | 0.06 |
| Magnesium stearate | 0.40 |

Colouring substances being added if desired. The mixture gives a total of 200,000 tablets.

EXAMPLE VI

Ampoules containing a 0.1 percent (weight by volume) solution of 3 - (dibenzo[a,d]-1,4-cycloheptadien-5-yloxy)-8-ethylnortropine are prepared in accordance with conventional pharmaceutical practice, from a mixture of the following substance:

| | G. |
|---|---|
| 3 - (dibenzo[a,d] - 1,4-cycloheptadien - 5 - yloxy)-8-ethyl-nortropine citrate | 15 |
| $Na_2HPO_4.2H_2O$ | 60 |
| $KH_2PO_4$ | 8.5 |
| Sodium chloride | 103.5 |

Water for injection sufficient to produce 15 l.

A mixture of the substances in the amounts stated hereinabove is sufficient to produce approximately 6800 ampoules.

What I claim and desire to secure by Letters Patent is:

1. A compound selected from the group consisting of

N-substituted - 3 - (dibenzo[a,d] - 1,4 - cycloheptadien-5-yloxy) nortropane derivatives represented by the formula:

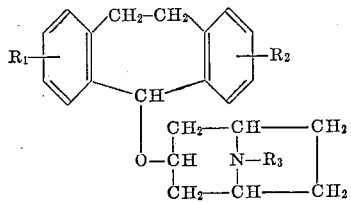

wherein $R_1$ and $R_2$ are each selected from the group consisting of hydrogen, halogen, and alkyl having at most 4 carbon atoms, and $R_3$ is selected from the group consisting of an alkyl having 2 to 8 carbon atoms, an aralkyl containing up to 8 carbon atoms in the alkyl moiety, and a hydroxyalkyl containing up to 8 carbon atoms, and non-toxic acid addition and quaternary ammonium salt thereof.

2. 3 - (dibenzo[a,d] - 1,4-cycloheptadien - 5 - yloxy)-8-ethylnortropane.

3. Non-toxic acid addition salts of 3-(dibenzo[a,d]-1,4-cycloheptadien-5-yloxy)-8-ethylnortropane.

4. 3 - (dibenzo[a,d] - 1,4-cycloheptadien-5-yloxy) - 8-octylnortropane.

5. Non-toxic acid addition salts of 3-(dibenzo[a,d]-1,4-cycloheptadien-5-yloxy)-8-octylnortropane.

6. 3 - (dibenzo[a,d] - 1,4-cycloheptadien - 5 - yloxy)-8-benzylnortropane.

7. Non-toxic acid addition salts of 3-(dibenzo[a,d]-1,4-cycloheptadien-5-yloxy)-8-benzylnortropane.

8. 3 - (dibenzo[a,d] - 1,4 - cycloheptadien-5-yloxy)-8-(β-phenylethyl)nortropane.

9. Non-toxic acid addition salts of 3-(dibenzo[a,d]-1,4-cycloheptadien-5-yloxy)-8-(β-phenylethyl)nortropane.

10. A compound selected from the group consisting of N - substituted - 3 - (dibenzo[a,d]-1,4-cycloheptadien - 5-yloxy) nortropanes represented by the formula:

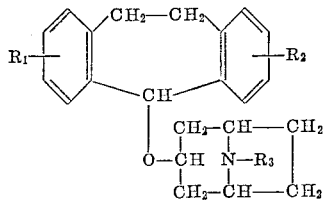

wherein $R_1$ and $R_2$ are each selected from the group consisting of hydrogen, halogen, and alkyl having at most 4 carbon atoms, and $R_3$ is selected from the group consisting of an alkyl having 2 to 8 carbon atoms, an aralkyl containing up to 8 carbon atoms in the alkyl moiety, and a hydroxyalkyl containing up to 8 carbon atoms.

11. A compound according to claim 1, in which $R_3$ is an alkyl having 2 to 8 carbon atoms.

12. A compound according to claim 1, in which $R_3$ is an aralkyl containing up to 8 carbon atoms in the alkyl moiety.

13. A compound according to claim 1, in which $R_3$ is a hydroxyalkyl containing up to 8 carbon atoms.

References Cited

UNITED STATES PATENTS 3,119,829  1/1964  Harms _____ 260—292

OTHER REFERENCES

Van der Stelt: J. Med. Pharm. Chem., vol. 4, No. 2 (1961), pp. 346–349.

Noller: Chemistry of Organic Compounds, 2nd ed., Saunders (1957), pp. 237, 478, 535, 536.

Fieser et al.: Advanced Organic Chemistry, Reinhold (1961), p. 505.

HENRY R. JILES, *Primary Examiner.*

A. ROTMAN, *Assistant Examiner.*